(12) United States Patent
Barendregt

(10) Patent No.: US 11,415,521 B2
(45) Date of Patent: Aug. 16, 2022

(54) FURNACE SUITED FOR CHEMILUMINESCENT SULPHUR DETECTION

(71) Applicant: AC ANALYTICAL CONTROLS B.V., Rotterdam (NL)

(72) Inventor: Erwin Barendregt, Brielle (NL)

(73) Assignee: AC Analytical Controls B.V., Rotterdam (NL)

( * ) Notice: Subject to any disclaimer, the term of this patent is extended or adjusted under 35 U.S.C. 154(b) by 251 days.

(21) Appl. No.: 16/478,889

(22) PCT Filed: Jan. 24, 2018

(86) PCT No.: PCT/NL2018/050048
§ 371 (c)(1),
(2) Date: Jul. 18, 2019

(87) PCT Pub. No.: WO2018/139920
PCT Pub. Date: Aug. 2, 2018

(65) Prior Publication Data
US 2019/0383748 A1    Dec. 19, 2019

(30) Foreign Application Priority Data

Jan. 26, 2017 (NL) .................................... 2018240

(51) Int. Cl.
*B01J 4/00* (2006.01)
*B01J 12/00* (2006.01)
(Continued)

(52) U.S. Cl.
CPC .......... *G01N 21/766* (2013.01); *B01J 12/005* (2013.01); *B01J 19/02* (2013.01);
(Continued)

(58) Field of Classification Search
None
See application file for complete search history.

(56) References Cited

U.S. PATENT DOCUMENTS 4,352,779 A    10/1982 Parks
5,424,217 A *  6/1995 Benner .............. G01N 33/0042
                                                        436/123
(Continued)

FOREIGN PATENT DOCUMENTS

JP    2015059876 A    3/2015

OTHER PUBLICATIONS

"Cordierite" from Wikipedia website. Retrieved on Aug. 26, 2021. (Year: 2021).*

(Continued)

*Primary Examiner* — Jennifer A Leung
(74) *Attorney, Agent, or Firm* — Snyder, Clark, Lesch & Chung, LLP

(57) ABSTRACT

The invention is directed to a furnace suited for oxidation of a gaseous starting mixture comprising one or more sulphur compounds to obtain an oxidized gas mixture and reduction of the oxidized gas mixture to obtain a gaseous mixture of reduced sulphur compounds comprising an interior furnace space, an inlet conduit for the gaseous starting mixture, an inlet for supply of an oxygen comprising gas, a ceramic comprising outlet conduit provided with an inlet opening for the mixture of reduced sulphur compounds, an inlet for hydrogen and heating means, wherein the inlet opening of the outlet conduit is comprised of more than one opening which openings fluidly connect the interior furnace space and the interior of the outlet conduit.

13 Claims, 2 Drawing Sheets

Figure 1:
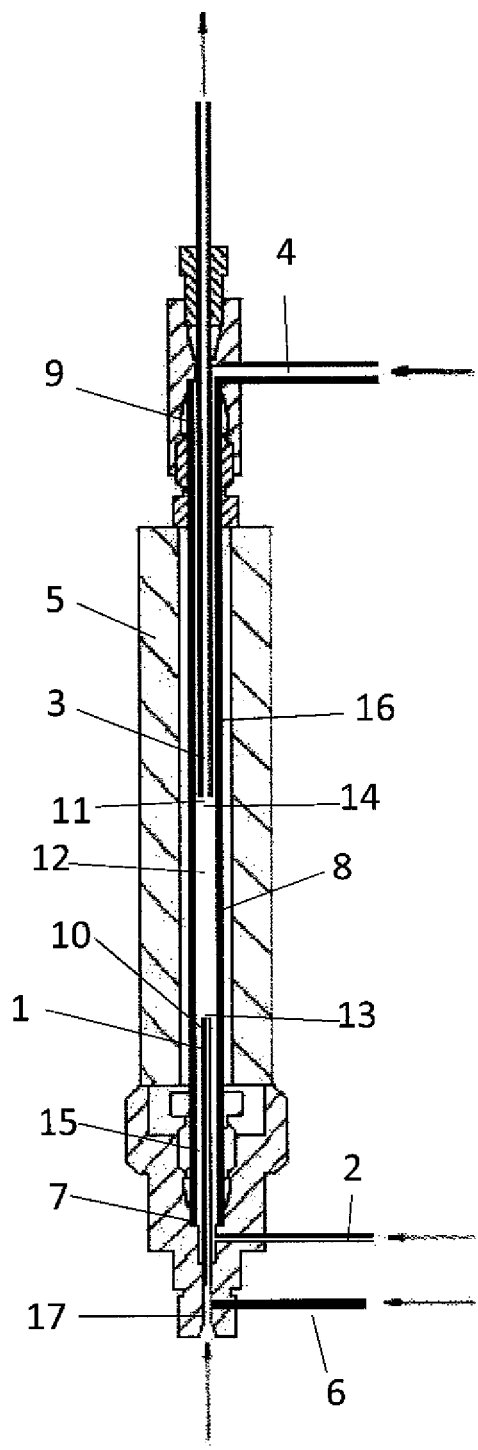

(51) Int. Cl.
  *B01J 19/02* (2006.01)
  *B01J 19/24* (2006.01)
  *G01N 21/76* (2006.01)
  *G01N 31/12* (2006.01)
  *G01N 30/84* (2006.01)
  *G01N 30/88* (2006.01)

(52) U.S. Cl.
  CPC ......... *B01J 19/244* (2013.01); *B01J 19/2475* (2013.01); *G01N 30/84* (2013.01); *G01N 31/12* (2013.01); *B01J 2204/005* (2013.01); *B01J 2219/00186* (2013.01); *B01J 2219/1943* (2013.01); *G01N 2030/8405* (2013.01); *G01N 2030/8854* (2013.01)

(56) References Cited

U.S. PATENT DOCUMENTS

| | | | | |
|---|---|---|---|---|
| 5,501,981 A | * | 3/1996 | Ray | G01N 21/766 |
| | | | | 436/123 |
| 5,614,417 A | * | 3/1997 | Kubala | G01N 21/76 |
| | | | | 422/52 |
| 5,916,523 A | | 6/1999 | Yan et al. | |
| 2005/0074365 A1 | | 4/2005 | Olstowski | |

OTHER PUBLICATIONS

Machine translation for JP 2015-059876 A. Retrieved from JPO website on Aug. 26, 2021. (Year: 2021).*

PCT International Search Report and Written Opinion issued for corresponding international application No. PCT/NL2018/050048, dated May 7, 2018, 14 pages.

Shearer, R.L.: "Development of Flameless Surfur Chemiluminescence Detection: Application to Gas Chromatography." Analytical Chemistry, vol. 64, No. 18, Sep. 15, 1992, pp. 2192-2196.

Burrow, P. L. and Birks, J. W.: "Flow Tube Kinetics Investigation of the Mechanism of Detection in the Surfur Chemiluminescence Detector." Analytical Chemistry, vol. 69, No. 7, Apr. 1, 1997, pp. 1299-1306.

* cited by examiner

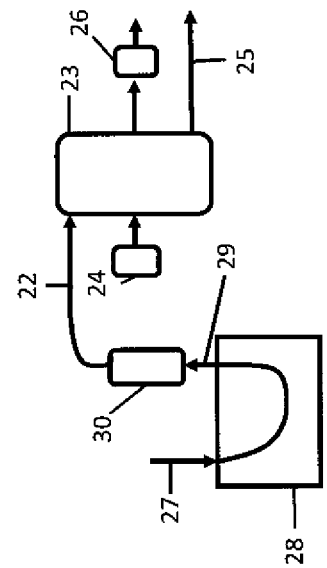
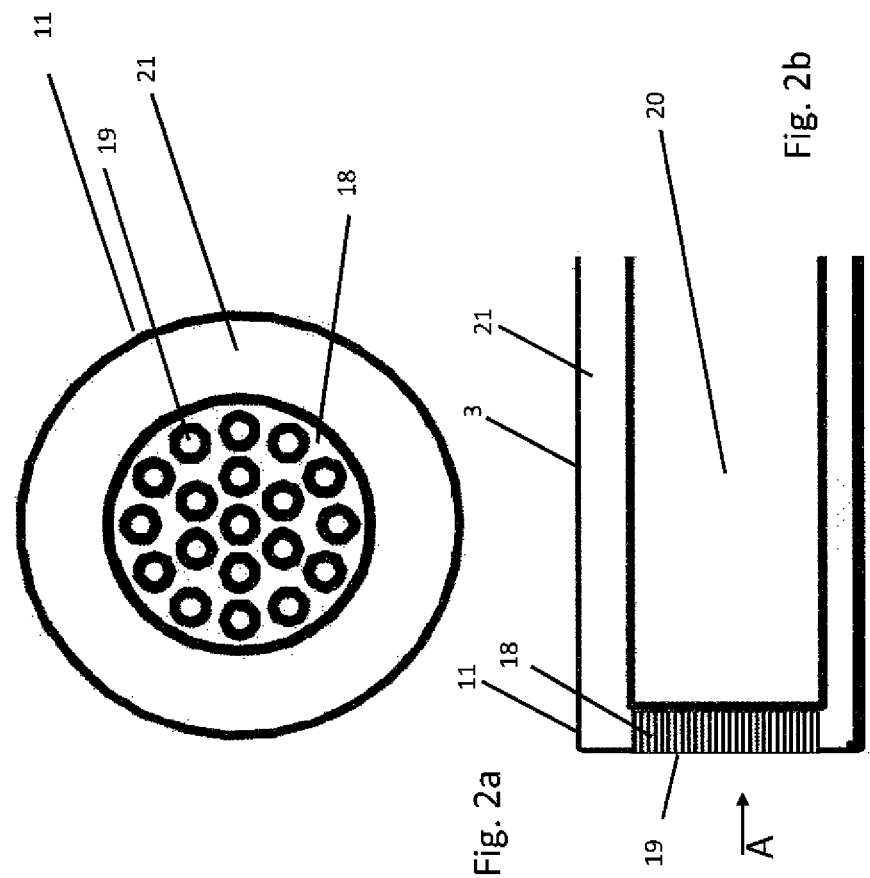
Fig. 3
Fig. 2a
Fig. 2b

FURNACE SUITED FOR CHEMILUMINESCENT SULPHUR DETECTION

The invention is directed to a furnace suited for oxidation of a gaseous starting mixture comprising one or more sulphur compounds to obtain an oxidized gas mixture and reduction of the oxidized gas mixture to obtain a gaseous mixture of reduced sulphur compounds.

Furnaces for quantitative chemiluminescent sulphur detection are well known and for example described in U.S. Pat. No. 5,916,523. Such a furnace may have an interior furnace space, an inlet conduit for the gaseous starting mixture, an inlet for supply of an oxygen comprising gas, a ceramic comprising outlet conduit provided with an inlet opening for the mixture of reduced sulphur compounds, an inlet for hydrogen and heating means. In such a furnace a gaseous starting mixture comprising of one or more sulphur compounds is oxidized to obtain an oxidized gas mixture. The oxidized gas mixture is subsequently reduced in the furnace to obtain a gaseous mixture of reduced sulphur compounds. The mixture of reduced sulphur compounds is subsequently provided to a downstream chemiluminescent analysis apparatus where this mixture reacts with ozone to obtain a sulphur compound in excited state. By measuring the chemiluminescent emission of the sulphur compound in excited state a measure for the amount of sulphur compounds in the gaseous starting mixture is obtained.

When such a prior art furnace is used as part of a chemiluminescent sulphur detection it is found that the stability of the measurement is not always acceptable. Stability is defined as the rate at which the sulphur detection changes when the same sample is repeatedly analysed by the same chemiluminescent analyser. At a high stability the sulphur detection will remain unchanged in time.

The object of the present invention is to provide a furnace suited for use in a method for chemiluminescent sulphur detection which results in that the stability is improved as compared to the known methods. This object is achieved by the following furnace.

Furnace suited for oxidation of a gaseous starting mixture comprising one or more sulphur compounds to obtain an oxidized gas mixture and reduction of the oxidized gas mixture to obtain a gaseous mixture of reduced sulphur compounds comprising an interior furnace space, an inlet conduit for the gaseous starting mixture, an inlet for supply of an oxygen comprising gas, a ceramic comprising outlet conduit provided with an inlet opening for the mixture of reduced sulphur compounds, an inlet for hydrogen and heating means, wherein the inlet opening of the outlet conduit is comprised of more than one opening which openings fluidly connect the interior furnace space and the interior of the outlet conduit.

Applicants found that the furnace when used in a method for chemiluminescent sulphur detection a higher stability is achieved. Further it is found that a comparable and sometimes improved equimolarity, selectivity, linearity and/or sensitivity is obtained when using the invented furnace in this method.

The invention is also directed to a method for chemiluminescent sulphur detection wherein the method comprises the following steps:

(a) oxidation of a gaseous starting mixture comprising one or more sulphur compounds to obtain an oxidized gas mixture, (b) reduction of the oxidized gas mixture as obtained in step (a) to obtain a gaseous mixture of reduced sulphur compounds, (c) passing the gaseous mixture through more than one opening in a ceramic wall, (d) reacting the mixture of reduced sulphur compounds obtained in step (b) with ozone to obtain a sulphur compound in excited state and measuring a chemiluminescent emission of the sulphur compound in excited state to obtain a measure for the amount of sulphur compounds in the gaseous starting mixture.

The invention will be described in more detail below.

The furnace according to the invention comprises an inlet conduit for a gaseous starting mixture, an inlet for supply of an oxygen comprising gas, an outlet conduit provided with an inlet opening for the mixture of reduced sulphur compounds, an inlet for hydrogen and heating means. Applicants found that by increasing the number of inlet openings of the outlet conduit an improved furnace in terms stability is obtained. Preferably the inlet opening of the outlet conduit comprises at least 4 openings and more preferably at least 5 openings and at most 50 openings. The openings fluidly connect the interior furnace space and the interior of the ceramic outlet conduit. The openings are therefore present in the ceramic wall of the outlet conduit. Preferably the openings are located at the upstream end of the outlet conduit. The openings may be present in the axial extending wall of the conduit or more preferably in an end wall of the conduit. By end wall is here meant the wall enclosing the upstream end opening of the conduit. The cross-sectional shape of the conduit may be square, rectangular, oval, star-shaped, rod-shaped or multi-angular. Preferably the cross-sectional shape is circular and the conduit is a tube. Preferably the outlet conduit is a tube which is provided with a circular end wall at its end and wherein the more than one opening of the inlet opening of the tubular outlet conduit are openings in said circular end wall.

The ceramic outlet conduit having a ceramic wall may be comprised of one of the following ceramics, silicas, aluminas, zirconias, silica-aluminas, alumina-silicates, magnesium-alumina-silicates and other high temperature ceramics. Preferably highly purified alumina or zirconia conduits are used. More preferably the ceramic outlet conduit has a magnesium-alumina-silicates wall. An example of a suitable magnesium-alumina-silicate is cordierite. The use of magnesium-alumina-silicate results in even better analytical performance parameters, like for example improved stability, sensitivity, selectivity and linearity, as compared to the typically used alumina. The outer diameter of preferred tubular outlet conduits may be between 1.5 and 15 mm.

It is believed that the increased contact area between the ceramic wall and the reduced sulphur compounds or compounds being reduced as they flow through the openings is the reason why the earlier referred to properties of the furnace improve. The optimal number and size of the openings will be partly determined by the available surface area in the ceramic wall. The remaining ceramic wall between the openings should provide enough strength that in use these do not break and thereby create larger openings. Further the openings should not be too small to avoid undesirable pressure drops. Preferably the openings have a circular cross-section and have a diameter of between 0.4-1.5 mm and preferably between 0.5-0.8 mm.

The openings are suitably present in the zone in the furnace where the reduction of the oxidized gas mixture takes place. This zone is about the location wherein the oxidised gas mixture contacts hydrogen. This may be achieved in a furnace wherein the inlet conduit for the gaseous mixture is co-axially protruding one end of a larger conduit and the outlet conduit for the mixture of reduced sulphur compounds is protruding the opposite end of the larger conduit. In this way the facing ends of the inlet conduit and the outlet conduit are spaced away from each other defining an intermediate zone separating an oxidation zone from a reduction zone. The heating means are positioned at the exterior of the larger conduit. An ignitor may be present at the oxidation zone or in the intermediate zone. Because the compounds supplied to the furnace auto-ignite at the normal operating temperatures such an ignitor is suitably not present.

The inlet conduit for the gaseous starting mixture is suitably fluidly connected to an inlet for a make-up gas defining a mixing zone for the gaseous starting mixture and the make-up gas. Suitably the inlet for make-up gas is provided with a constant pressure valve suited to in use achieve a constant pressure in the mixing zone. This enables the constant pressure in the mixing zone as also described earlier. The make-up gas may comprise hydrogen next to a make-up gas, such as helium.

Suitably a first annular space is present between the interior of the larger conduit and the exterior of the inlet conduit and wherein the inlet for supply of an oxygen comprising gas is positioned at one end of the first annular space such that in use a stream of oxygen comprising gas flows from the inlet for supply of an oxygen comprising gas through the first annular space towards the intermediate zone. The inlet conduit for the gaseous mixture preferably has a relatively large pressure drop. Such a pressure drop in combination with the constant pressure in the optional upstream mixing zone results in a substantially constant and well defined flow through said inlet conduit. This is advantageous for a good determination of the sulphur compounds. Further a second annular space is suitably present between the interior of the larger conduit and the exterior of the outlet conduit for the mixture of reduced sulphur compounds and wherein the inlet for hydrogen is positioned at one end of the second annular space such that in use a stream of hydrogen flows from the inlet for hydrogen through the second annular space towards the intermediate zone.

The larger conduit, inlet conduit and outlet conduit may have any cross-sectional shape. For practical reasons these conduits are suitably tubular. The inlet conduit and larger conduit may be made out of any high temperature resistant material, like for example selected metals or alloys, like steel and the above referred to ceramic materials. In a possible embodiment of the present invention the inlet conduit for the gaseous mixture may be made of steel and the larger conduit made of alumina. Suitably the inlet conduit and larger conduit are also comprised of a ceramic material. Suitably at least two heating means are present along the length of the larger conduit which heating means can independently from each other heat the exterior of the larger conduit such that the temperature in the oxidation zone can be different, preferably higher, from the temperature in the reduction zone.

The gaseous starting mixture as used in the method according this invention will comprise of one or more sulphur compounds. These sulphur compounds include sulphur oxides and compounds wherein sulphur is chemically bound in organic and inorganic compounds.

The gaseous starting mixture may be obtained from a liquid or gaseous sample. A liquid sample will have to be evaporated before being able to be subjected to step (a). The starting mixture is suitably obtained in a separation device. Preferably such a separation device is a gas chromatograph. The starting mixture may then in time have a variable composition. This allows to determine the origin of the sulphur in a sample as fed to the separation device. A starting mixture as obtained in a gas chromatograph will typically comprise a carrier gas.

Preferably the gaseous starting mixture comprises added hydrogen when contacting with oxygen or an oxygen comprising gas in step (a). This is advantageous because the hydrogen when contacted with oxygen at the elevated temperatures will self-ignite and provide locally a high temperature. This is preferred because this results in that less external heating is necessary. The amount of hydrogen is sub-stoichiometric relative to the amount of oxygen provided to step (a) such to have enough oxygen left to react with the sulphur compounds. Hydrogen may be added as such. Preferably hydrogen is added in admixture with a make-up gas, such as for example nitrogen, argon and preferably helium. More preferably this mixture of make-up gas and hydrogen is added to the gaseous starting mixture before performing step (a). Even more preferably the amount of make-up gas-hydrogen mixture added to the gaseous starting mixture in a mixing zone having a constant pressure. The pressure is held constant by varying the flow of make-up gas and optional hydrogen gas as supplied to said mixing zone. The over-pressure may be between 5 and 100 kPa. Having a mixing zone with a constant pressure is advantageous because the flows to step (a) will then be more constant and less dependent on any upstream process or device. In case the upstream device is a gas chromatograph fluidly connected to such a mixing zone a more defined flow in said gas chromatograph results. This is advantageous for better interpretation of the analytical results obtained in such a system.

The process conditions in steps (a)-(d) may be performed according to generally known chemiluminescent sulphur detection methods as for example described in U.S. Pat. No. 5,916,523, which publication is hereby incorporated by reference, and in Shearer, R. L. Anal. Chem. 1992, 64, 2192-2196, "Development of Flameless SCD: Application to Gas Chromatography"; and Priscilla L. Burrow & John W. Birks, Anal. Chem. 1997, 69, 1299-1306, "Flow Tube Kinetics Investigation of the Mechanism of Detection in the SCD". A skilled person will know how to optimise and tune the method for chemiluminescent sulphur detection.

In step (a) a gaseous starting mixture comprising one or more sulphur compounds is subjected to oxidation to obtain an oxidized gas mixture. The oxidation in step (a) is suitably performed by contacting the gaseous starting mixture with oxygen or an oxygen comprising gas. The amount of oxygen and the conditions in step (a) should be sufficient to oxidize the entire amount of combustible compounds in the starting mixture into oxides. It is believed that the sulphur and sulphur compounds are converted to a sulphur oxide. The temperature in step (a) may be between 300 and 2200° C., preferably between 400 and 1200° C. The residence time is suitably sufficient to convert preferably all of the sulphur compounds to sulphur oxides. In step (a) any hydrocarbon components in the compounds will be converted to carbon oxides and water.

In step (b) the oxidized gas mixture as obtained in step (a) is subjected to reduction to obtain a gaseous mixture of reduced sulphur compounds. The reduction is suitably performed by contacting the oxidized gas mixture with hydrogen or a hydrogen comprising gas. The amount of hydrogen and the conditions in step (b) should be sufficient to reduce the oxidized sulphur compounds to reduced sulphur compounds capable of ozone induced chemiluminescent. Such compounds include without limitation hydrogen sulphide, sulphur, sulphur monoxide, polysulphides, HxSy compounds and any other sulphur compounds capable of ozone induced chemiluminescent as also described in more detail in Priscilla L. Burrow & John W. Birks, Anal. Chem. 1997, 69, 1299-1306, "Flow Tube Kinetics Investigation of the Mechanism of Detection in the SCD". The temperature in step (b) may be between 300 and 2200° C. and preferably between 400 and 1000° C. Preferably the temperature in step (a) is higher than in step (b). The residence time is suitably sufficient to convert preferably all of the sulphur oxides to the earlier referred to reduced sulphur compounds.

Step (a) is suitably performed in a furnace and more suitably steps (a) and (b) are performed in the same furnace. Such a combined furnace is suitably a single elongated furnace wherein at one end of the furnace the oxidation of step (a) takes place in an oxidation zone and at the opposite end of the furnace the reduction of step (b) takes place in a reduction zone. Suitably at the end of the furnace at which the reduction takes place a ceramic outlet tube for the gaseous mixture of reduced compounds is present. Such a ceramic outlet conduit will be comprised of a ceramic wall with the more than one openings as in step (c). It may well be that step (b) and step (c) overlap. The reduction of the oxidised gas mixture may for a part take place when the gaseous compounds pass the more than one openings in the ceramic wall. The number and dimensions of the openings in the ceramic wall and of the ceramic outlet conduit may be as described above for the furnace.

In step (d) the mixture of reduced sulphur compounds obtained in step (b) and step (c) is reacted with ozone to obtain a sulphur compound in excited state also referred to as meta-stable sulphur compounds. Reaction with ozone and measuring a chemiluminescent emission of the sulphur compound in excited state in step (d) may be performed according to well-known methods in well-known apparatuses as for example described in the aforementioned patent and articles.

The invention is also directed to the use of the furnace according to the invention for chemiluminescent sulphur detection and preferably the chemiluminescent sulphur detection is according to the invention.

FIG. 1 shows a furnace according to the invention having a steel inlet tube (1) for the gaseous starting mixture, an inlet (2) for supply of an oxygen comprising gas, a ceramic outlet tube (3) for the mixture of reduced sulphur compounds, an inlet (4) for hydrogen, heating means (5). The steel inlet tube (1) for the gaseous starting mixture is co-axially protruding one end (7) of a larger tube (8). The outlet tube (3) protrudes the opposite end (9) of the larger tube (8) such that the facing open ends (10, 11) of the inlet tube (1) and the outlet tube (3) are spaced away from each other defining an intermediate zone (12) separating an oxidation zone (13) from a reduction zone (14) and wherein the heating means (5) are positioned at the exterior of the larger tube (8). An inlet (6) for supply of a make-up gas and hydrogen is shown which fluidly connects at a mixing zone (17) upstream the steel inlet tube (1) for the gaseous starting mixture. The arrows indicate the flow direction.

FIG. 1 also shows a first annular space (15) present between the interior of the larger tube (8) and the exterior of the inlet tube (1) and wherein the inlet (2) for supply of an oxygen comprising gas is positioned at one end of the first annular space (15) such that in use a stream of oxygen comprising gas flows from the inlet (2) for supply of an oxygen comprising gas through the first annular space (15) towards the oxidation zone (13) and intermediate zone (12). A second annular space (16) is present between the interior of the larger tube (8) and the exterior of the outlet tube (3) for the mixture of reduced sulphur compounds. The inlet (4) for hydrogen is positioned at one end of the second annular space (16) such that in use a stream of hydrogen flows from the inlet (4) for hydrogen through the second annular space (16) towards the reduction zone (14) and intermediate zone (12).

FIG. 2b shows the upstream end of the ceramic outlet tube (3) of FIG. 1. Open end (11) is provided with a circular end wall (18). This circular and ceramic end wall (18) is provided with 19 openings (19) (not exactly drawn to scale). These openings (19) fluidly connect the interior furnace space and the interior (20) of the outlet conduit (3). Further shown is the axially extending side wall (21) of tube (3). FIG. 2a shows view A of FIG. 2b. In this Figure the 19 openings (19) can be clearly seen as present in circular and ceramic end wall (18). The end wall (18) faces the intermediate zone (12). The hydrogen flowing via second annular space (16) towards end (11) will contact the oxidized gas mixture while entering openings (19). The design as shown in FIGS. 2a and 2b ensures that a substantially evenly divided stream of hydrogen and oxidized gas mixture enters openings (19). The evenly distribution of flow may even be further improved by combining openings (19) with different sized openings. The larger sized openings are positioned such that the flow path from the annular space (16) for hydrogen to these openings is larger than the flow path for hydrogen flowing through the smaller sized openings (19).

FIG. 3 shows a sulphur detection system for detecting sulphur in a sample (27) to be analysed. Shown is a gas chromatograph (GC)(28) to which a sample (27) is fed. The sample (27) may be a liquid sample, like for example a sulphur containing crude oil derived fraction, which will be quickly heated in the GC to fully evaporate. The different components will be separated in the capillary column of the GC (28) and in time be supplied as the starting mixture (29) to a furnace (30) according to the present invention. Furnace (30) may be a furnace as shown in FIG. 1. In the furnace steps (a), (b) and (c) of the method according to the invention will take place. An effluent (22) comprising sulphur compound is fed to an optical detector (23) in which step (d) takes place. To optical detector (23) ozone is fed as generated in ozone generator (24). In the optical detector (23) the sulphur compounds react with ozone to sulphur compounds in excited state which create chemiluminescence which in turn is detected by a photo sensitive device as part of detector (23). The output of detector (23) is an electrical signal (25) being a measure for the sulphur concentration in the injected liquid sample (18). The reaction products are continuously discharged from optical detector (23) by means of a vacuum pump (26). The invention is also directed to a system for chemiluminescent sulphur detection as illustrated in FIG. 3 comprising a gas chromatograph, a furnace according to the invention, an ozone generator and an optical detector.

EXAMPLE

In a test set-up as shown in FIG. 3 two alumina outlet tubes (B,C) were compared. Outlet tube B is an outlet tube according to the prior art and has a single opening which fluidly connects the interior furnace space and the interior of the outlet tube B. Outlet tube C is an outlet tube according to the present invention as illustrated in FIG. 2 wherein 21 openings (19) fluidly connect the interior furnace space and the interior (20) of the outlet tube C. The dimensions of the outlet tube B and C are given in the below Table, wherein OD is the tube outer diameter and ID is the diameter of the opening or openings fluidly connecting the interior furnace space and the interior of the outlet tube interior of the outlet tube. The different outlet tubes B and C were tested in the same furnace using the same test samples for a comparable period of time. The Stability, Sensitivity, Equimolarity, Selectivity and Linearity were measured and the results are provided in the below Table. One "+" means a result equal to the results for the prior art tubes A and B. A "+++" means an improvement in that properties as compared to the results for the prior art tubes A and B.

| Design | B | C |
|---|---|---|
| OD (mm) | 5.0 | 5.0 |
| Number of Openings | 1 | 21 |
| Diameter opening (mm) | 1.5 | 0.5 |
| Results | | |
| Stability | + | +++ |
| Sensitivity | + | ++ |
| Equimolarity | + | + |
| Selectivity | + | ++ |
| Linearity | + | +++ |

The invention claimed is:

1. A furnace suited for oxidation of a gaseous starting mixture comprising one or more sulphur compounds to obtain an oxidized gas mixture and reduction of the oxidized gas mixture to obtain a gaseous mixture of reduced sulphur compounds comprising:
   an interior furnace space,
   an inlet conduit for the gaseous starting mixture,
   an inlet for supply of an oxygen comprising gas,
   a ceramic comprising outlet conduit provided with an inlet opening for the mixture of reduced sulphur compounds,
   an inlet for hydrogen, and
   a heating element, wherein the inlet opening of the outlet conduit is comprised of more than one opening which openings fluidly connect the interior furnace space and the interior of the outlet conduit.

2. A furnace according to claim 1, wherein the inlet opening of the outlet conduit is comprised of at least four openings.

3. A furnace according to claim 2, wherein the inlet opening of the outlet conduit is comprised of at least five openings and at most 50 openings.

4. A furnace according to claim 1, wherein the outlet conduit is a tube tubular outlet conduit which is provided with a circular end wall at its end and wherein the more than one opening of the inlet opening of the tubular outlet conduit are openings in said circular end wall.

5. A furnace according to claim 1, wherein the inlet conduit for the gaseous starting mixture is fluidly connected to an inlet for a make-up gas defining a mixing zone for the gaseous starting mixture and the make-up gas upstream the inlet conduit for the gaseous starting mixture and wherein the inlet for make-up gas is provided with a constant pressure valve to achieve a constant pressure in the mixing zone.

6. A furnace according to claim 1, wherein the inlet conduit for the gaseous mixture co-axially protrudes into one end of a larger conduit and the outlet conduit for the mixture of reduced sulphur compounds protrudes into the opposite end of the larger conduit such that the facing ends of the inlet conduit and the outlet conduit are spaced away from each other defining an intermediate zone separating an oxidation zone from a reduction zone and wherein the heating element is positioned at the exterior of the larger conduit.

7. A furnace according to claim 6, wherein a first annular space is present between the interior of the larger conduit and the exterior of the inlet conduit and wherein the inlet for supply of the oxygen comprising gas is positioned at one end of the first annular space such that in use a stream of oxygen comprising gas flows from the inlet for supply of the oxygen comprising gas through the first annular space towards the intermediate zone and wherein
   a second annular space is present between the interior of the larger conduit and the exterior of the outlet conduit for the mixture of reduced sulphur compounds and wherein the inlet for hydrogen is positioned at one end of the second annular space such that in use a stream of hydrogen flows from the inlet for hydrogen through the second annular space towards the intermediate zone.

8. A furnace according to claim 7, wherein the outlet conduit is a tubular outlet conduit which is provided with a circular end wall at its end and facing the intermediate zone and wherein the more than one opening of the inlet opening of the tubular outlet conduit are openings in said circular end wall.

9. A furnace according to claim 6, wherein at least two heating elements are present along the length of the larger conduit, and wherein the heating elements are configured to independently from each other heat the exterior of the larger conduit such that the temperature in the oxidation zone is different from the temperature in the reduction zone.

10. A furnace according to claim 1, wherein the ceramic of the ceramic comprising outlet conduit is silica, alumina, zirconia, silica-alumina, alumina-silicate or magnesium-alumina-silicate.

11. A furnace according to claim 10, wherein the ceramic of the ceramic comprising outlet conduit is magnesium-alumina-silicate.

12. A furnace according to claim 1, wherein the ceramic of the ceramic comprising outlet conduit is cordierite.

13. A system for chemiluminescent sulphur detection comprising a gas chromatograph, a furnace according to claim 1, an ozone generator and an optical detector.

* * * * *

UNITED STATES PATENT AND TRADEMARK OFFICE
CERTIFICATE OF CORRECTION

| | |
|---|---|
| PATENT NO. | : 11,415,521 B2 |
| APPLICATION NO. | : 16/478889 |
| DATED | : August 16, 2022 |
| INVENTOR(S) | : Erwin Barendregt |

It is certified that error appears in the above-identified patent and that said Letters Patent is hereby corrected as shown below:

In the Claims

Claim 4, Column 7, Line 50 should read:
conduit is a tubular outlet conduit which is provided Signed and Sealed this
Twenty-second Day of November, 2022

Katherine Kelly Vidal
*Director of the United States Patent and Trademark Office*